United States Patent [19]

Wada et al.

[11] Patent Number: 4,639,862
[45] Date of Patent: Jan. 27, 1987

[54] COMPUTER SYSTEM

[75] Inventors: Hideo Wada; Humio Goto, both of Hadano, Japan

[73] Assignee: Hitachi, Ltd., Tokyo, Japan

[21] Appl. No.: 544,136

[22] Filed: Oct. 21, 1983

[30] Foreign Application Priority Data

Mar. 14, 1983 [JP] Japan ............................. 58-40676

[51] Int. Cl.⁴ .......................................... G06F 13/00
[52] U.S. Cl. .................................................. 364/200
[58] Field of Search ... 364/200 MS File, 900 MS File

[56] References Cited

U.S. PATENT DOCUMENTS 4,395,755  7/1983  Wakai ........................ 364/200
4,476,522  10/1984  Bushaw ..................... 364/200
4,479,178  10/1984  Schabowski ................ 364/200

Primary Examiner—James D. Thomas
Assistant Examiner—Emily Yue Chan
Attorney, Agent, or Firm—Antonelli, Terry & Wands

[57] ABSTRACT

A computer system has a CPU, a main memory and an additional memory storage which is difficult from the main memory and an external storage. The additional storage may transmit data with the main memory and/or the CPU.

5 Claims, 6 Drawing Figures

FIG. 3
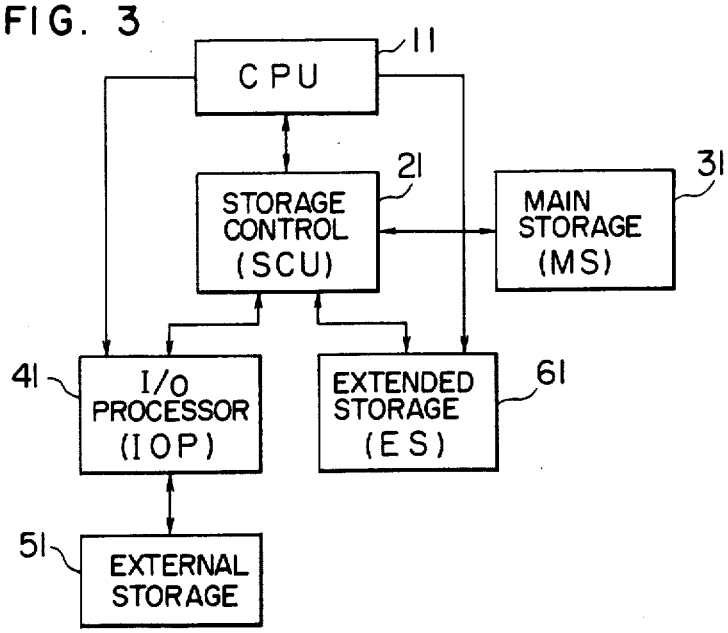
FIG. 5
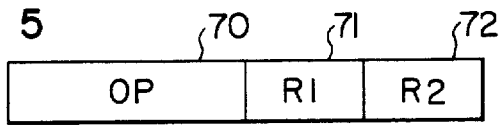
FIG. 6
(1)
| READ | A1 | A2 |
(2)  A1: MAIN STORAGE ADDRESS
     A2: EXTENDED STORAGE ADD.
     A2+1: TRANSFER BLOCK NUMBER

COMPUTER SYSTEM

BACKGROUND OF THE INVENTION

1. Field of the Invention

This invention relates to a computer system.

2. Description of the Prior Art

Diagrammatically shown in FIG. 1 is a prior art computer system which comprises a central processor unit (CPU) 10, a storage control unit 20, a main storage 30, an input/output processor 40 and an external storage 50.

Since capacity of the main storage 30 is finite, the external storage 50 is required which can store data necessary for the CPU 10, and it is accessed for reading and writing. In the computer system shown in FIG. 1, the external storage 50 is accessed for "writing" or "reading" data from or to an area in the main storage 30 as follows.

More particularly, the CPU 10 commands the input/output processor 40 to execute an input/output initiation instruction under the control of the processor 40 by itself. An example of input/output processor 40 is shown in FIG. 2. A control 400 included in the input/output processor 40 receives the input/output initiation instruction and thereafter it is freed from intervention by the CPU to read from a given address in the main storage 30 via the storage control unit 20 an instruction indicative of the type of input/output operation such as "read" or "write", an address in the main storage 30 which is subject to input/output operation and the number of bytes to be transferred, thereby setting the read-out data into latches 401, 402 and 403. The input/output processor 40, freed from intervention by the CPU 10, uses the data in the three latches to access data in the external storage 50 in order to read or write the data from or into the main storage 30 via the storage control unit 20. When the CPU 10 completes the transmission of the input/output initiation instruction to the input/output processor 40, it is released from the controlling of the input/output operation and can participate in execution of another information processing in parallel with the input/output operation. When the input/output operation is terminated, the input/output processor 40 performs an input/output interruption to hand over the controlling to the CPU 10, thereby apprising the program of results of its operation.

According to the aforementioned system for data transfer between the external storage and the main storage, execution time of the program is obviously prolonged as compared to a system in which data necessary for computation are all stored in a main storage. Especially, in large-scale scientific technical calculations, it happens that all of the data in a matrix are not stored in a main storage. As a result, additional input/output operations are needed with respect to an external storage and these input/output operations require calculation time. Accordingly, the type of input/output operation has a great effect on the execution time of the program.

The prior art computer system has the following disadvantages in view of the type of input/output operation:

(a) Time is consumed before the CPU issues the input/output initiation instruction; and (b) Time is consumed for the CPU to execute the interruption processing after the CPU receives the input/output interruption.

The above item (a) is due to the fact that the number of program steps is increased for searching and allotting a usable external storage connected to the input/output processor and searching a usable storage type such as disc or magnetic tape, and that positioning of the external storage is time consuming. Item (b) is due to the fact that the number of program steps is increased for processing the other competitive interruptions and the execution of the input/output interruption. Thus, time overhead is inevitably increased in the prior art system wherein input/output operations between the main storage and the external storage are effected through the input/output processor, and the execution of the input/output operations is initiated by the input/output initiation instruction and terminated by the input/output interruption.

SUMMARY OF THE INVENTION

An object of this invention is to reduce the time overhead of the i/o interruption.

According to this invention, in a computer system comprising a central processor unit and a main storage, a storage (referred to as an extended storage hereinafter) is added which is independently addressable from the main storage and an external storage through the medium of an input/output processor, so as to effect data transfer directly with respect to the main storage.

The present invention will be apparent from the following detailed description taken in conjunction with the accompanying drawings, in which:

BRIEF DESCRIPTION OF THE DRAWINGS

FIG. 3 is a block diagram of a computer system according to the present invention;

FIG. 5 shows an instruction format used in the computer system according to the invention; and FIG. 6 shows a "read" instruction format obtained by implementing the FIG. 5 instruction format.

DESCRIPTION OF THE PREFERRED EMBODIMENT

Figure 1:
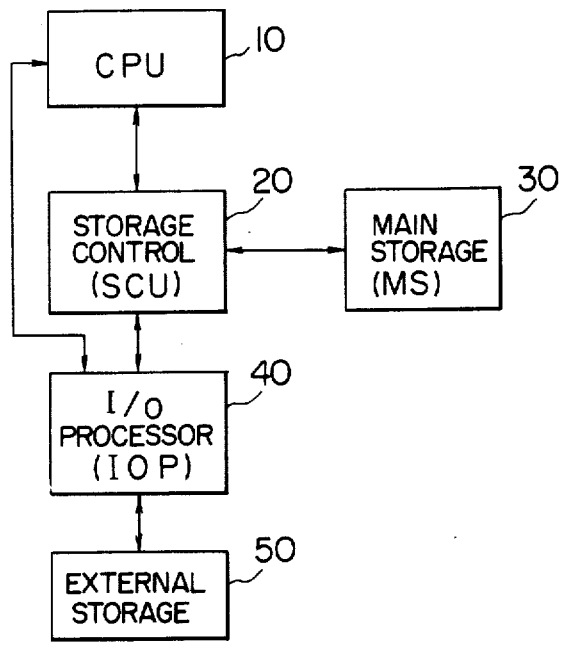
FIG. 1 is a block diagram of a prior art computer system.
Figure 2:
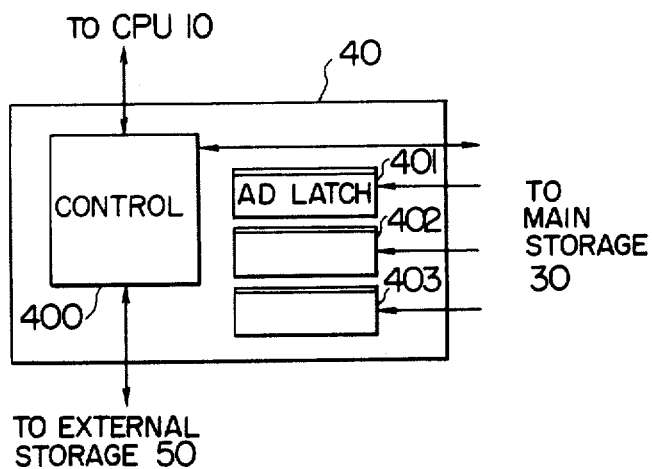
FIG. 2 shows an input/output processor used in FIG. 1.

Referring now to FIG. 3, a computer system according to an embodiment of the present invention comprises a CPU 11, a storage control unit (SCU) 21, a main storage (MS) 31, an input/output processor (IOP) 41, an external storage 51, and an extended storage (ES) 61. This computer system adds the extended storage 61 to the prior art computer system shown in FIG. 1. An example of a super computer provided with an extended storage is disclosed in NIKKEI ELECTRONICS published on Oct. 25, 1982 in Japan, page 99, line 7 in upper left column to line 11 in upper right column.

Figure 4:
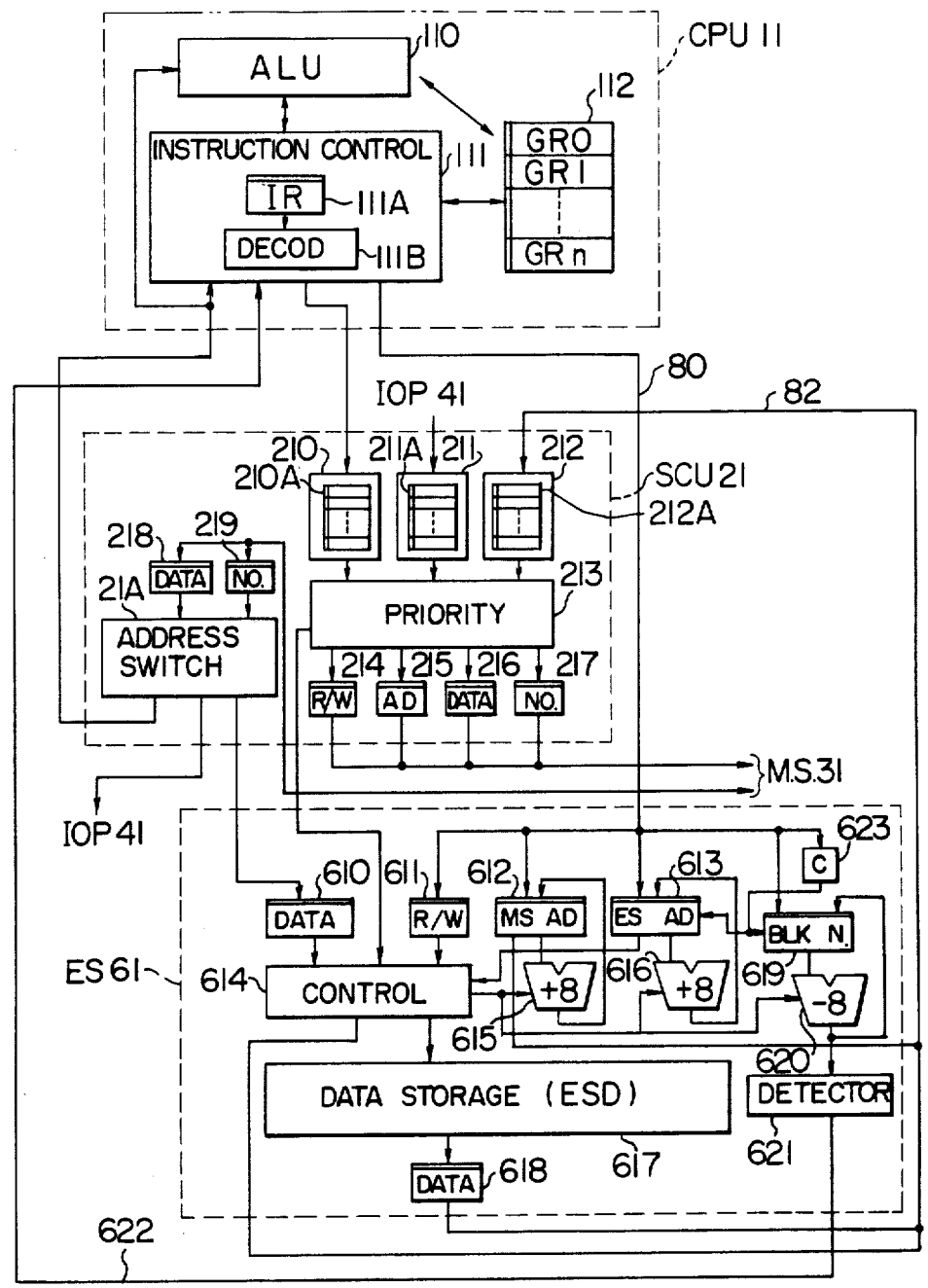
FIG. 4 shows a CPU, a storage control unit and an extended storage which are constructed according to the present invention and used in FIG. 3.

The CPU 11, storage control unit 21 and extended storage 61 are constructed as shown in FIG. 4. The CPU 11 includes an arithmetic logical unit (ALU) 110, an instruction control 111, and a general register group 112. The ALU 110 executes operations. The instruction control 111 adapted to control the execution of instructions includes an instruction register 111A set with an instruction and a decoder 111B which decodes the instruction set in the instruction register to apply a command to various units. The general register group 112 consists of registers which can be designated by a program.

The storage control unit 21 includes access request stacks 210, 211 and 212, a priority decision section 213, latches 214 to 219, and an address switching circuit 21A. The access request stacks 210, 211 and 212 have stacks 210A, 211A and 212A, respectively. Access requests to the main storage 31 from the CPU 11, input/output processor 41 and the extended storage 61 are stacked in the stacks 210, 211 and 212, respectively. The priority decision section 213 selects one of access requests sent from the access request stacks 210, 211 and 212 in accordance with a predetermined priority and sends a selected access request to the main storage 31. The latches 214, 215, 216 and 217 are respectively set with an instruction ("read" or "write") of the access request selected by the access request priority decision section 213, a main storage address, a write data, and an access request originator number (indicating which issues the access request, the CPU 11, input/output processor 41 or extended storage 61). The latches 218 and 219 are respectively set with a data read out of the main storage 31 and an access request originator number corresponding to the read-out data. The address switching circuit 21A sends the requested data in the latch 218 to a requesting unit in accordance with the content of the latch 219. For example, if the number in the latch 219 specifies the extended storage 61, the circuit 21A outputs the data in the latch 218 to the extended storage. The extended storage 61 includes latches 610 to 613 and 619, counters 615, 616 and 620, a control 614, a data storage 617, a latch 618, a detector 621, and a clear circuit 623. The latches 610 to 613 and 619 are respectively set with a data read out of the main storage 31, an instruction ("read", "write" etc.) sent from the CPU 11, a main storage address designated by the instruction, an extended storage address designated by the instruction, and the number of blocks to be transferred. The counter 615 counts up the address set in the latch 612, and the counter 616 counts up the address set in the latch 613. The data storage 617 for storing data consists of storage media allotted with addresses. The control 614 controls "read" and "write" of the data. The latch 618 is set with the data read out of the data storage 617.

Address allotment in the main storage and the extended storage is formalized in accordance with an embodiment of the present invention as follows:

(a) The main storage and the extended storage are allotted with addresses belonging to different address spaces. In other words, main storage addresses are not correlated to extended storage addresses; and (b) The main storage is allotted with addresses based upon a unit of a byte whereas the address allotment for the extended storage is coarser than for the main storage. For example, it is assumed herein that the extended storage is allotted with addresses based upon a unit of 4 kilo bytes (KB), the addresses are sent from the CPU 11 to the extended storage 61 through the line 80.

The address allotment of the present invention pursuant to the above items (a) and (b) distinguishes the present system from the prior art system in the following points. Because of the structure of the system, it is impossible in the prior art to designate addresses in the external storage as operand data of an instruction whereas item (a) stipulated by the present invention permits the address designation as operand data of an instruction by using latch circuits. Further, while, in the prior art, the data transfer between the main storage and the external storage is effected based upon a unit of a byte, item (b) produced by the present invention can enlarge the unit of data transfer.

The extended storage 61 is accessed for "read" and "write" as will be described below.

FIG. 5 shows a "read"/"write" instruction format for the extended storage 61. An operation field 70 contains an instruction code indicative of "read" or "write". A first operand field 71 contains a number assigned to a register in the general register group 112. A second operand field 72 contains a number assigned to another register in the general register group 112. In advance of execution of the instruction, the general register of the number designated by the field 71 must be stored with a main storage address, the general register of the number designated by the field 72 must be stored with an extended storage address, and a general register of a number which is the number designated by the field 72 plus one, i.e. by A2+1, must be stored with the number of transfer blocks (one block equals 4 KB). In compliance with item (b) above, the main storage address and the extended storage address to be stored in the general registers must be addresses which are compatible with a quantity of a block of 4 KB. The main storage is subject to the address allotment based upon a unit of a byte and may be accessed in a unit of a byte. But for simplicity of controlling, it is assumed that the main storage is accessed in a unit of 4 KB.

An instruction "read" is for transferring data in the extended storage 61 to the main storage 31 and has a format as shown at section (1) in FIG. 6. A field 70 contains an instruction code indicative of the instruction "read", and fields 71 and 72 contain numbers assigned to registers in the general register group 112. The register numbers are herein defined as A1 and A2. In advance of execution of the instruction, a general register A1 has been stored with an address of the main storage 31, a general register A2 with an address of the extended storage and a general register (A2+1) with the number of transfer blocks, as shown at section (2) in FIG. 6.

The execution of the instruction "read" will now be described with reference to FIG. 4. When an instruction "read" is set in the instruction register 111A, it is decoded by the decoder 111B so that a read instruction, a main storage address, an extended storage address and the number of data blocks to be transferred are sent to the extended storage 61 through a signal line 80 and set in the latches 611 to 613 and 619, respectively. The extended storage address and the number of blocks are coarse, i.e., they are based on the unit of 4 KB and the remainder least significant 12 bits of the latches 613 and 619 are all preset to zero using a clear circuit 623 connected to the CPU through the signal line 80. The control 614 monitors the content of the latch 611 to initiate a read operation. A read request is executed in a unit of a predetermined storage elements in the main storage 31 and of the extended storage 61, and the unit of accessing is herein 8 bytes. The data of 8 bytes are parallely read although each byte can be addressed. In accordance with the extended storage address in the latch 613, data is read out of the data storage 617 and the read-out data is set in the latch 618. The control 614 prepares an access request for writing the data set in the latch 618 into the main storage address set in the latch 612 and sends the access request to the storage control unit 21 via a signal line 82. The access request, main storage address and data are temporarily stacked in the access request stack 212 and thereafter sent to the access priority decision section 213. When the information is selected by the access priority decision section 213, an instruction of the access request indicative of "write", the main storage address, the data, and a number assigned to an access request originator (indicative of the extended storage 61) are respectively set in the latches 214, 215, 216 and 217 and thereafter they are sent to the main storage 31 to write the data thereinto. In this manner, initial 8 bytes of the data are transferred from the extended storage 61 to the main storage 31. When one access request has thus been sent to the main storage 31, the storage control unit 21 sends to the extended storage 61 via a signal line 81 a signal which permits the extended storage 61 to send a next access request. The control 614 is responsive to the signal on signal line 81 to drive the counters 615 and 616 which in turn advance the contents of the latches 612 and 613 by eight so that the latches 612 and 613 can respectively designate a main storage address and an extended storage address to be accessed subsequently. A processing as in the preceding is carried out by using the updated contents of the latches 612 and 613 to transfer next 8 bytes from the extended storage 61 to the main storage 31. Subsequently, data in the extended storage are sequentially transferred by eight bytes to the main storage 31 in a similar manner.

The instruction control 111 manages the number of transfer blocks and instructs the extended storage 61 to effect data transfer of a predetermined number of blocks. The instruction control 111 monitors the output from the detector 621 through a line 622 to know the time when the transfer of data of the predetermined number of blocks designated by the extended storage 61 is terminated. The block number in the latch 619 is decreased by eight using the counter 620 at the every stage of the eight byte transfer and will reach the value zero at the termination of the data transfer. Thus, the instruction ends.

Next, operation of an instruction "write" will be described.

The instruction "write" is for transferring data in the main storage 31 to the extended storage 61. In a "write" instruction format, the "read" instruction code in the field 70 shown at section (1) in FIG. 6 is exchanged with a "write" instruction code.

When an instruction "write" is set in the instruction register 111A, it is decoded by the decoder 111B so that a write instruction, a main storage address and an extended storage address are sent to the extended storage 61 via the signal line 80 and set in the latches 611, 612 and 613. The control 614 monitors the content of the latch 611 to initiate a write operation. Like the read request, a write request is executed in units of 8 bytes. The control 614 prepares, on the basis of the main storage address set in the latch 612, an access request for reading the data and sends the access request to the storage control unit 21 via the signal line 82. The access request and the main storage address are stacked in the access request stack 212 and thereafter sent to the access priority decision section 213. When the information is selected by the access priority decision section 213, an instruction of the access request indicative of "read", the main storage address, and the number assigned to the access request originator (indicative of the extended storage 61) are respectively set in the latches 214, 215 and 217 and thereafter they are sent to the main storage 31 to read the data therefrom. Subsequent to reading the data out of the main storage 31, the read-out data and the access request originator number (indicative of the extended storage 61) are set in the latches 218 and 219, respectively. The address switching circuit 21A is responsive to the content of the latch 219 to send the data in the latch 218 to the originator, that is, extended storage 61. The extended storage 61 sets the data into the latch 610 and the control 614 writes the data set in the latch 610 into the extended storage address in the data storage 617 which is designated by the content of the latch 613. Simultaneously, the control 614 advances the content of the latch 613 by eight using the counter 616 to designate an extended storage address to be accessed subsequently. In this manner, the initial data of 8 bytes is transferred from the main storage 31 to the extended storage 61. As in the case of the execution of the instruction "read", the storage control unit 21 sends a signal on the signal line 81 when the access request from the extended storage 61 is sent to the main storage 31, so that the signal permits the extended storage 61 to send a next access request. The control 614 advances the content of the latch 612 by eight using the counter 615 to designate a main storage address to be accessed subsequently. A processing as in the precedence is carried out by using the updated content of the latch 612 to transfer next 8 bytes from the main storage 31 to the extended storage 61.

Subsequently, data in the main storage 31 are sequentially transferred to the extended storage 61 in a similar manner.

The number of transfer blocks is managed as in the case of the instruction "read".

According to the foregoing embodiment of the present invention, the following effects can be obtained.

1. Since the address allotment for the extended storage is coarser than for the main storage, one instruction permits large capacity of data transfer to be effected.

2. Since the data transfer between the extended storage and the main storage can be effected through the storage control unit by means of an instruction issued from the CPU and addresses in the extended storage can be directly designated as an operand of the instruction, time conventionally required for searching, allotting and access-positioning a usable external storage connected to the input/output processor can be eliminated.

3. Since the CPU manages the execution of an input/output instruction for the extended storage and ending of an input/output operation terminates in ending of the instruction, any input/output interruption conventionally required for ending the input/output operation is not needed, thereby eliminating time for post-processing of the input/output interruption.

It will be appreciated that the foregoing description has been given on the assumption that the external storage 51 is accessed by operating a mechanical system such as disc or magnetic tape whereas the extended storage 61 is comprised of semiconductor memory cells.

The access time for the external storage is much longer than for the main storage. Therefore, as in the prior art system, it is inevitable to leave the input/output operation to the input/output processor and to release the CPU from the input and output during input/output operations. However, recent progress in semiconductor technology aids in development of high-speed and large-capacity memory cells, thus leading to realization of a large-capacity external storage (corresponding to extended storage 61 in FIG. 3) which has access time comparable to that of the main storage. Under the circumstances, the system of direct data transfer between the main storage and external storage can be materialized in accordance with the present invention.

We claim:

1. A computer system comprising
   (a) a central processing unit,
   (b) a main storage,
   (c) a storage control unit for controlling read-out from and writing into said main storage in response to an instruction issued from said central processing unit, and
   (d) an extended storage connected to said central processing unit and said storage control unit, wherein
   (e) said extended storage includes an address space which is independent of the address space of said main storage,
   (f) said central processing unit includes an instruction control for providing said extended storage with an instruction of transferring data between said main storage and said extended storage, said instruction having an instruction code and an operand address consisting of a main storage address and an extended storage address,
   (g) said extended storage includes
      (i) means for holding the instruction code given by the instruction, the main storage address and the extended storage address, and
      (ii) control means for controlling said extended storage in response to the instruction code received from said means for holding and transferring the main storage address held in said means for holding together with data read out from said extended storage to said storage control unit as a write request into said main storage when said instruction code indicates a read instruction; and for transferring the main storage address held in said means for holding to said storage control unit as a read request from said main storage, receiving data read out from said main storage through said storage control unit and writing said data to said extended storage at said extended storage address held in said means for holding when the instruction code indicates a write instruction.

2. A computer system according to claim 1 wherein said central processing unit further comprises register means for holding a transfer block number which is a part of said instruction and which is a function of a unit of a first predetermined byte number, and
   said extended storage comprising means for detecting completion of transferring data of said transfer block number in the unit of said first predetermined byte number between said extended and main storage.

3. A computer system according to claim 1 wherein said central processing unit further comprising register means for holding a transfer block number which is a part of said instruction and which is a function of a unit of a first predetermined byte number, and
   said extended storage comprising means for detecting completion of transferring data of one block between said extended and main storages, wherein said instruction control provides said extended storage with said main and extended storage addresses until the transfer of said data of said transfer block number held in said register means has been completed.

4. A computer system according to claim 3, wherein said data transfer is effected in repetition by transferring a second predetermined byte number not larger than said one block and said extended storage provides said storage control with said read/write request at every repetition of said block data transfer.

5. A computer system according to claim 4, wherein said second predetermined number is eight and said one block is data of four KB.

* * * * *